United States Patent [19]

Verholt

[11] Patent Number: 4,896,926
[45] Date of Patent: Jan. 30, 1990

[54] STACKABLE DRAWER BOX

[75] Inventor: Johannes M. Verholt, Ulft, Netherlands

[73] Assignee: Atlanta Hoogezand B.V., Hoogezand, Netherlands

[21] Appl. No.: 198,900

[22] Filed: May 26, 1988

[30] Foreign Application Priority Data

May 27, 1987 [NL] Netherlands .......................... 8701263

[51] Int. Cl.$^4$ ............................................ F16B 12/00
[52] U.S. Cl. .................................. 312/111; 220/4 D; 24/573; 24/458
[58] Field of Search ....................... 206/503; 220/4 D; 211/194; 312/111, 257 R; 24/573, 574, 458, 606, 616

[56] References Cited

U.S. PATENT DOCUMENTS

| | | |
|---|---|---|
| 2,561,561 | 7/1951 | Cella . |
| 3,432,216 | 3/1969 | Yang . |
| 3,552,579 | 1/1971 | Simon et al. . |
| 3,672,495 | 6/1977 | Bauer et al. .......................... 220/4 D |
| 4,395,080 | 7/1983 | Winn et al. ............................ 312/111 |
| 4,526,427 | 7/1985 | Boll et al. ............................. 312/111 |
| 4,620,636 | 11/1986 | Herr et al. ......................... 211/194 X |
| 4,701,984 | 10/1987 | Wyckoff ................................ 24/573 |
| 4,787,553 | 11/1988 | Hoskins ............................ 206/503 X |

FOREIGN PATENT DOCUMENTS

| | | |
|---|---|---|
| 2402525 | 1/1974 | Fed. Rep. of Germany . |
| 2451175 | 11/1980 | France ................................... 24/616 |
| 7406395 | 5/1974 | Netherlands . |
| 1508916 | 8/1975 | United Kingdom . |
| 2117038 | 10/1983 | United Kingdom .................. 24/616 |

Primary Examiner—Joseph Falk
Attorney, Agent, or Firm—Fleit, Jacobson, Cohn, Price, Holman & Stern

[57] ABSTRACT

A stackable drawer box having a plurality of side walls and boxes for a coupling element disposed thereon. The boxes and the coupling element are provided with lug members and stops enabling a displacement of the coupling element in a box from an inoperative position, in which a coupling element is present within a box of a single drawer box, into a coupling position, in which a coupling element coacts with the boxes of two stacked drawer boxes, and in which a displacement of the coupling element relative to both boxes is blocked by the lug members and the stops. A filing cabinet composed of a plurality of drawer boxes comprises a base and an upper portion, both being coupled to the drawer boxes in the same manner as the drawer boxes mutually.

17 Claims, 4 Drawing Sheets

STACKABLE DRAWER BOX

FIELD OF THE INVENTION

This invention relates to a stackable drawer box, suitable in particular for drawers for filing continuous forms, as well as to a filing cabinet consisting of a plurality of stacked and interconnected drawer boxes, and to a coupling element for drawer boxes.

BACKGROUND OF THE INVENTION

It is known from practice to stack a plurality of drawer boxes, each adapted to receive one drawer, onto each other to form a filing cabinet suitable for storing documents, e.g. continuous forms. The drawers may be provided to that end with binding prongs coacting with perforations in the documents and/or with clamping members and the like for clamping the documents.

The known stackable drawer boxes are mostly fitted with an embossment in an upper and a lower surface, the embossment of the lower surface of a drawer box engaging in or about the embossment of the upper surface of the subjacent drawer box, thereby preventing mutual displacement.

SUMMARY OF THE INVENTION

It is an object of the present invention to provide a stackable drawer box connectable in a simple but reliable and solid manner to similar drawer boxes, to thereby form a stable filing cabinet.

A drawer box of the above described type is characterized to that end by a drawer box for use with a coupling element provided on at least two of the walls of the drawer box. The box and the coupling element are provided with coacting lug means and stops adapted to enable a displacement of the coupling member in a box from an inactive position, where the coupling element is present substantially within a box of a single drawer box, into a coupling position, where the coupling element coacts with the boxes of two stacked drawer boxes. A displacement of the coupling element relative to the two boxes is blocked by the coacting lug means and stops of the coupling element and the boxes.

BRIEF DESCRIPTION OF THE DRAWINGS

One embodiment of the present invention will now be described, by way of example, with reference to the accompanying drawings, in which.

DETAILED DESCRIPTION OF THE DRAWINGS

Figure 1:
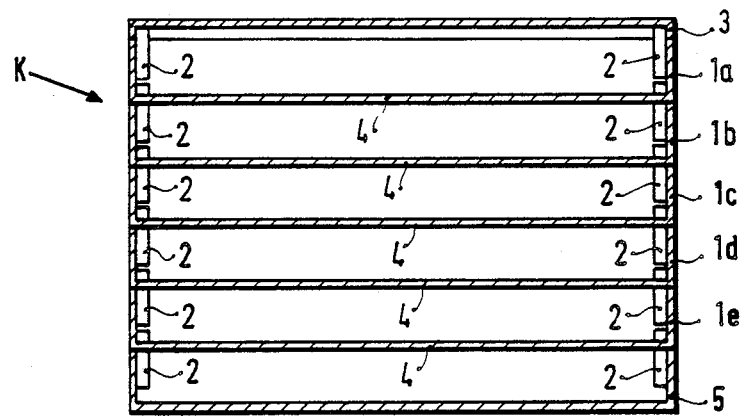
FIG. 1 is a front view of a filing cabinet built up from stacked and coupled drawer boxes according to the present invention.

FIG. 1 is a front view of a filing cabinet K built up from stacked drawer boxes 1a–1e. The filing cabinet is shown without drawers. On both vertical side walls of the filing cabinet are shown coupling elements 2, which interconnect the drawer boxes, but which are normally not visible in a front view.

The drawer boxes 1a–1e are identical. The filing cabinet K comprises besides the drawer boxes an upper portion 3, covering the upper drawer box. The upper portion 3 is preferably constructed in such a manner that it can be interconnected in the same manner as the drawer boxes and by means of the same coupling element to a drawer box. In this connection it is observed that the drawer boxes shown are open at the top. In principle, the drawer boxes, however, can each be provided with an upper wall. In that case, it is not necessary to use a separate upper portion.

The drawer boxes shown each have a bottom 4 for supporting a drawer. Bottom 4, however, may be open entirely or partly.

The example shown finally, illustrates a base 5, which may be identical to the drawer boxes but may also be shaped differently. Base 5 is constructed preferably such that it can be coupled to the drawer boxes in the same manner as a drawer box.

Figure 2:
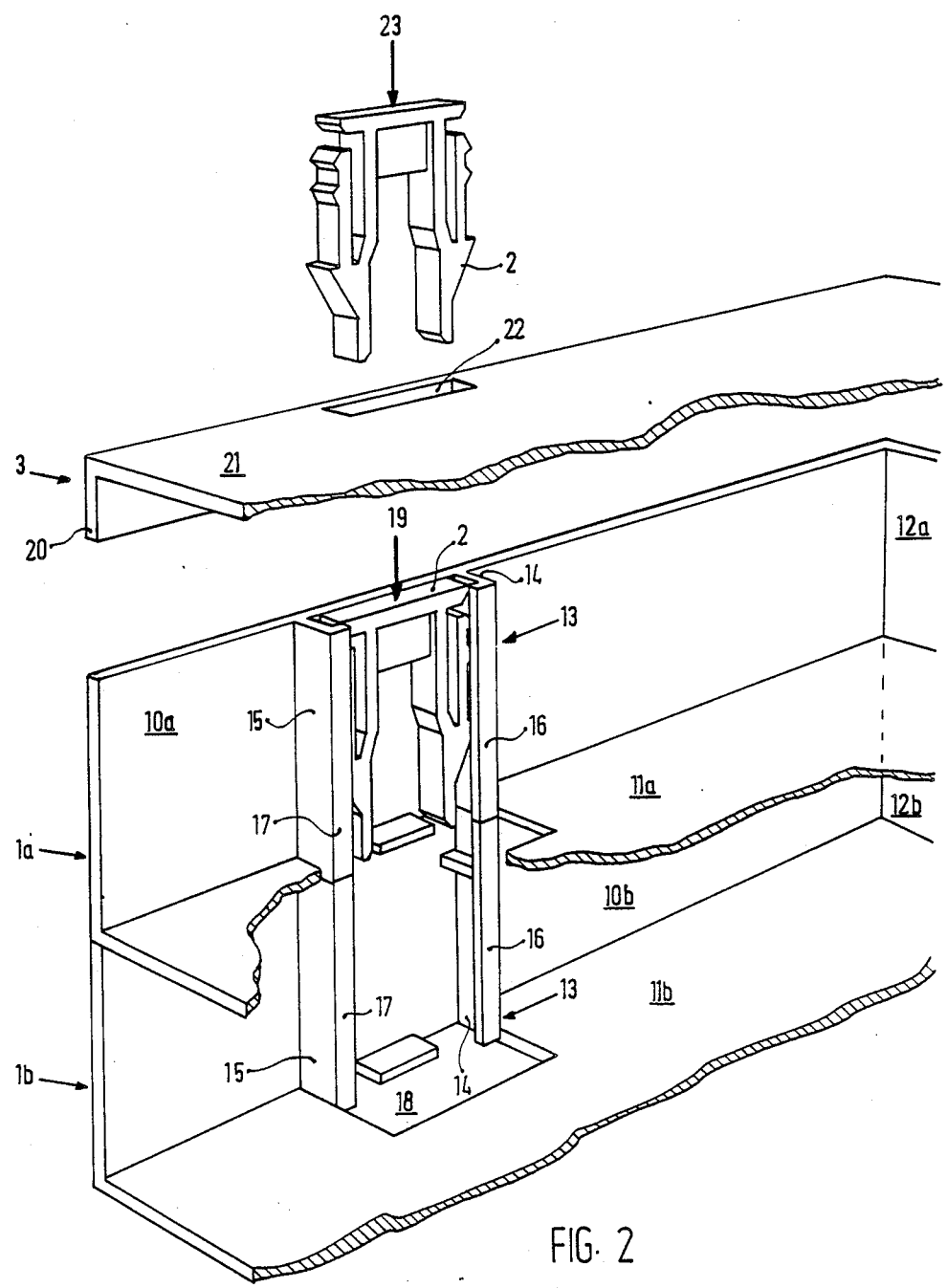
FIG. 2 is a perspective view of the manner in which according to the invention, drawer boxes can be coupled with each other and with an upper portion of a filing cabinet.

FIG. 2 is a perspective view of the manner in which drawer boxes according to the invention can be coupled to each other. A drawer box 1a with a vertical (left) side wall 10a, a partly shown bottom 11a and a partly shown rear wall 12a, is placed on a substantially identical drawer box 1b with a left side wall 10b, a partly shown bottom 11b and a partly shown rear wall 12b.

The drawer boxes 1a and 1b are each fitted with at least two boxes 13 for a coupling element 2. The boxes of the drawer boxes 1a and 1b in the example shown are provided on the inside of the side walls 10a and 10b. Preferably, also the side walls, not shown in FIG. 2, disposed opposite the walls 10a, 10b, are provided with similar boxes, as shown in FIG. 1. However, the boxes could be situated as an alternative, e.g. on the rear wall and a side wall of a drawer box. Furthermore, the boxes can in principle also be provided on the exterior of the drawer boxes.

The boxes are arranged in such a manner that a coupling element can be retained in two discrete positions, i.e. an inactive position and a coupling position. The boxes are further so arranged that a coupling element 2 present in a box in the coupling position engages partly in the box of a superposed or subjacent drawer box to effect the desired coupling. In the embodiment shown, the coupling elements in the coupling position coact with the box of a subjacent drawer box.

In the example shown, each box comprises two spaced apart vertical strips 14, 15, disposed on the respective wall. Strips 14, 15 have facing surfaces between which a coupling element 2 can be provided. The facing surfaces are provided with lug means adapted to coact with corresponding lug means of a coupling element.

In the embodiment shown, each strip is provided on the edge remote from the associate wall with a bent flange 16, 17, with the free edges of flanges 16, 17 facing each other. The flanges confine effectively the coupling elements in the box in such a manner that the coupling elements can be moved in a vertical direction only.

Adjacent the box 13, there is provided in the bottom of the drawer box an opening 18 through which a coupling element can be brought into coaction with a box of a subjacent drawer box. When the drawer boxes have an upper wall, the upper wall should have a corresponding cut-out.

FIG. 2, for the sake of clearness, only shows the coupling element 2 of the drawer box, i.e. in the inactive state. As will be explained hereinafter, the coupling element can be brought into the operative state, i.e. the coupling state, by exerting a force directed according to an arrow 19 on the coupling element, so that the coupling element is displaced in a downward direction.

It is observed that the drawer boxes, preferably complete with the coupling element, can be packed and stored in the inactive state.

A base need not have its own coupling element. When in FIG. 2, the drawer box 1b serves as a base, there is no coupling element in the box of the drawer box. Moreover, cut-out 18 can then be dispensed with.

FIG. 2 further shows an upper portion 3 for a filing cabinet. The upper portion in this example has a vertical (left) side wall 20, as well as a rear wall, not shown, and a right-hand side wall, and a partly shown upper wall 21.

Upper wall 21, at the level of boxes 13 of the drawer boxes, is fitted with a cut-out 22, through which a coupling element 2 can be pushed into the box of the upper drawer box, as indicated with an arrow 23.

The upper portion 3 may further be provided underneath the cut-out(s) 22 with boxes corresponding with boxes 13, but this is not strictly necessary.

Figure 3:
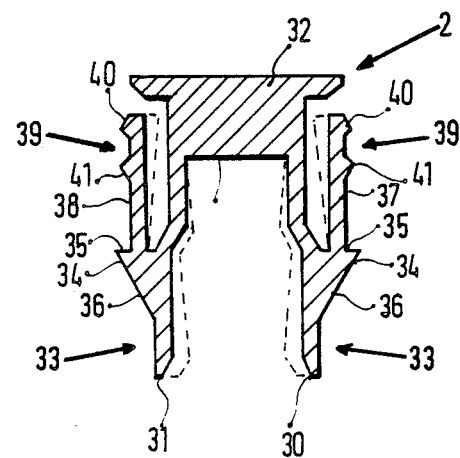
FIG. 3 shows an example of a coupling element according to the invention.
Figure 4:
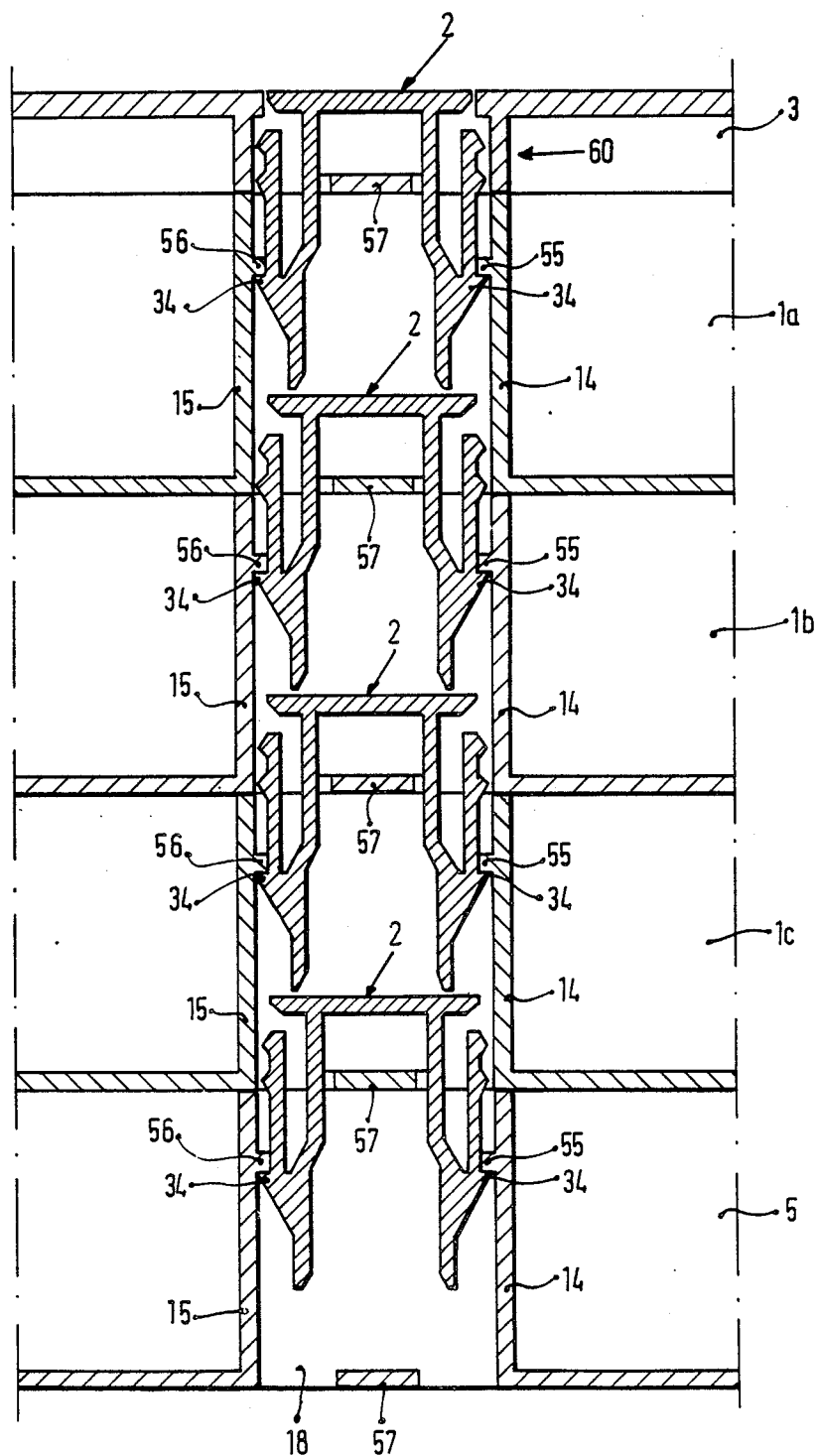
FIG. 4 shows a plurality of drawer boxes in a coupled state.
Figure 5:
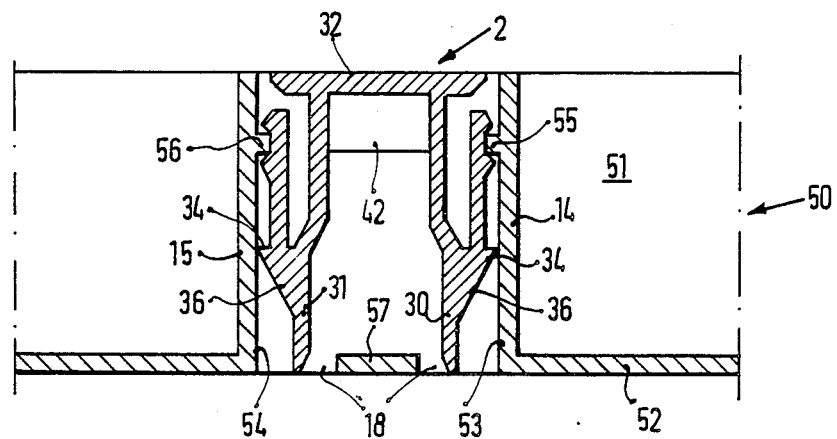
FIG. 5 shows a drawer box with a coupling element disposed therein in the inactive state.

The operation of the coupling elements will now be further described, with reference to FIGS. 3-5.

FIG. 3 shows a preferred embodiment of a coupling element according to the present invention. The coupling element shown has approximately an (inverted) U-shape with two legs 30, 31 and a connecting portion 32. Legs 30, 31 are resilient and can be slightly inward under the influence of forces indicated symbolically with arrows 33, as shown in broken lines. The legs, in the example shown, at an approximate midsection, each have an outwardly extending nose 34, which at the top, i.e. the side remote from the free end of the legs, is bounded by an upper surface 35 extending transversely to the legs, and at the bottom by a surface 36, extending obliquely towards the associated leg.

From each top surface 35 of the nose, there extends a finger 37, 38 in an upward direction, substantially parallel to the legs 30, 31. Between the legs 30, 31 and the fingers 37, 38, there is provided an interspace. The fingers further release the outer portion of the noses 34.

The connecting portion 32, in the embodiment shown, forms a slightly enlarged bottom of the U-shape, which extends beyond the place of attachment of the legs and thereby likewise roofing the fingers 37, 38. Fingers 37, 38 terminate at a short distance underneath the connecting portion 32 and, just like legs 30, 31, are resilient. Consequently, fingers 37, 38 can be bent inward under the influence of forces indicated symbolically by arrows 39, as shown in broken lines.

Adjacent the free end, the fingers each have a first lug-shaped cross rib 40 and a second lug-shaped cross rib 41 formed at a short interspace underneath the first lug-shaped cross rib. The lug-shaped cross ribs are preferably fitted with run-on surfaces which upon up and down movement of the coupling element, simplifies the passage of lugs provided on the inner surfaces of strips 14, 16 of a box.

FIG. 3 and also FIG. 5 further show that in the example shown there is provided a reinforcing partition 42, contiguous to the connecting portion 32, between the legs 30, 31. The underside of this partition serves also as a stop in a manner to be described.

FIG. 4 partly shows diagrammatically three stacked drawer boxes disposed on a base and further provided with an upper portion. All portions are interconnected through coupling elements 2, which are in the coupling position shown in FIG. 4.

FIG. 5 (partly) shows a single drawer box provided with a coupling element being in the inoperative state.

FIGS. 4, 5 both show that portion of the drawer boxes that is fitted with a box for a coupling element. Flanges 16, 17 (FIG. 2), however, are omitted, so that the operation of the coupling elements is well visible. Similar observations apply to the upper portion, and the base, respectively, also visible in FIG. 4.

The drawer box shown in FIG. 5 is identical to the drawer boxes shown in the other figures, at least as far as of relevance for the description of the invention and is indicated at 50. Parallel, vertical strips 14, 15 are provided on a wall 51 of the drawer box, between which strips there is arranged a coupling element 2. At the level of strips 14, 15, there is formed in the bottom 52 of the drawer box an opening 18 through which the legs of the coupling element can be moved downwards into the coupling position shown in FIG. 4.

In the position shown in FIG. 5, the lug-shaped ribs 40, 41 of each finger 37, 38 engage jointly about a lug 55, 56 disposed on the inner surface 53, 54, which lug may have the shape of a cross rib. In this position, the top of the connecting portion 32 of coupling element 2 preferably is co-planar with the upper edge of the side wall of the drawer box, while the free ends of the legs 30, 31 preferably are just flush with the plane defined by the underside of bottom 52.

The coupling element can be brought into the position shown in FIG. by pressing it from the top into box 13 in the position shown, thereby automatically bending the legs 30, 31 inwardly through the effect of the run-on surfaces 36 and lugs 55, 56, as shown in FIG. 3. After the noses 34 have thus passed lugs 55, 56, the legs again spring outwardly, with the noses 34 coming to lie substantially against surfaces 53, 54. Subsequently, the coupling element is pushed further downwards until the lug-shaped ribs 41 abut against lugs 55, 56. Due to the lower run-on surfaces of the lug-shaped ribs, the fingers 37, 38 will automatically spring inward when the pressure force is continued and, after the passage of the lugs, will again click back, so that lugs 55, 56 are confined between ribs 40, 41 and, when no further pressure force is exerted, remain confined there. This inoperative position of the coupling elements is therefore a stable position, so that there is no need to fear loss of a coupling element once mounted in the above described manner.

When a pressure force is exerted on the top surface of a coupling element being in the position shown in FIG. 5, the coupling element can be pushed further into box 13. To that effect, there is provided at the other end of box 13 an opening, such as opening 18, to pass the ends of legs 30, 31 of the coupling element.

When there is provided underneath box 13 of a drawer box, a corresponding box of a subjacent drawer box, the legs 30, 31 of a coupling element can be pushed from the position shown in FIG. 5 into the box 13 of the subjacent drawer box.

As soon as the noses 34 are present in the box of a subjacent drawer box, there is already obtained a lock against relative displacement of the drawer boxes.

A coupling producing forces having a component directed transversely to the lower or upper surface of the drawer boxes, i.e. a coupling enabling to manipulate a filing cabinet built up from a plurality of coupled drawer boxes, is obtained by means of lugs 55, 56, noses 34, partition 42 and a stop 57 not yet described (FIG. 5).

FIG. 4 diagrammatically shows a local cross section of a filing cabinet composed of drawer boxes 1a, 1b, 1c, an upper portion 3 and a base 5. The coupling elements 2 are in the coupling position. This is achieved, starting from the position shown in FIG. 5, by pressing the coupling elements downwards to such an extend into a box of a subjacent drawer box or the base that the noses 34, in the manner already described, pass the lugs 55, 56 and click behind the lugs.

The coupling elements can now no longer be moved upwards because the top surface of each nose and the bottom surface of lugs 55, 56 extend transversely to the only direction of movement of the coupling elements allowed by the boxes.

Only by bending the legs 30, 31 of a coupling element towards one other, e.g. manually or with suitable pincers, can the coupling element be uncoupled again.

The coupling elements cannot be further moved downwards either as a result of the presence of a stop 57 disposed between strips 14, 15 on the wall of the drawer box. Stop 57 is placed in such a manner that the legs of a coupling element can pass unimpededly and the connecting portion 3 and/or partition 42 cannot pass.

The vertical distance between the top surface of stop 57 and the bottom surface of lugs 55, 56 of a subjacent drawer box in a stack of drawer boxes is substantially equal to the distance between the top surface 35 of noses 34 and the bottom surface of the connecting portion 32 or partition 42 of a coupling element.

In this manner, it is achieved that the coupling elements 2 in the coupling position firmly couple the drawer boxes or a drawer box and a base with each other.

Stop 57, as shown in the figures, can advantageously be co-planar with the bottom of a drawer box. For reasons of efficiency, the base can be identical to a drawer box and then also have an opening 18 and a lug 57, as shown in FIG. 4. However, this is not necessary.

In respect of the upper portion 3, it is observed that this can be secured to a drawer box also by means of a coupling element 2. The upper portion to that effect, as already observed, is provided with an opening at the level of each box 13 of a drawer box. The upper portion further has a stop 57 adapted to coact with the connecting portion 32 of partition 42 of a coupling element, similarly as already described for two coupled drawer boxes. The top portion, in the embodiment shown, also has a box 60, comparable to boxes 13 of the drawer boxes, but this is not necessary. Preferably, opening 22 in the top portion tightly encloses the top surface of a coupling element in the coupling position and the top surface of the coupling element is co-planar with the top surface of the top portion.

Building a filing cabinet by means of drawer boxes according to the present invention can take place as follows. Positioned on a base is a drawer box in which coupling elements 2 are already disposed in the position shown in FIG. 5, or coupling elements are installed in that position, and subsequently the coupling elements are pressed downwards until the noses 34 click behind lugs 55, 56. In the same manner, further drawer boxes are then installed one by one on the resulting assembly of base and drawer box and finally the assembly is covered with an upper portion attached with associated coupling elements.

It is also possible to first form the desired stack of base, drawer boxes and upper portion and subsequently to exert a sufficiently large force on the upper coupling element to bring, in one operation, all coupling elements into the coupling position. However, the latter is possible only if the height of the coupling elements is equal to the height of the drawer boxes.

It is observed that, after studying the above, various modifications will readily occur to one skilled in the art. For instance, by changing the position and/or shape of the stop 57, the partition 42 could be omitted entirely or partly or may have a different shape. In principle, also the lower sections of the legs 30, 31 could be omitted. The lugs 40, 41 of fingers 37, 38 could be replaced by a single lug adapted to click between two lugs of the box 13. Moreover, the locking of the coupling elements in the inoperative position could be effected also entirely or partly by means of noses 34 and associated lugs of box 13.

Figure 6:
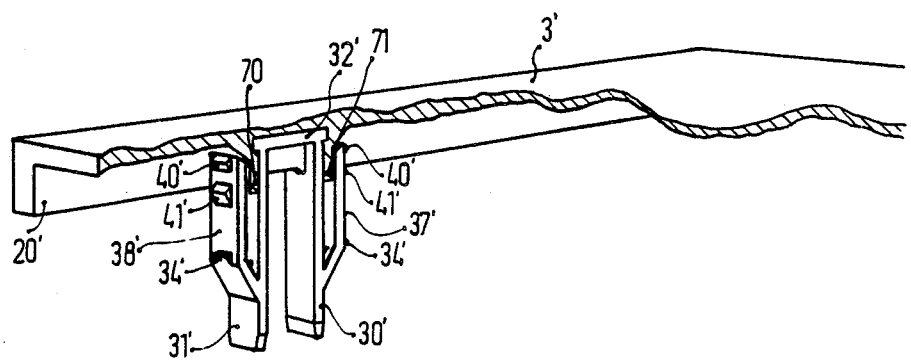
FIG. 6 is a diagrammatic view of a modification of the present invention.

FIG. 6 shows by way of example a possible modification of a coupling element according to the present invention. The major difference with the coupling elements described above is that the connecting portion 32' is now designed in such a manner that it can be pushed into a complementary cut-out of the upper portion 3', with the walls of the upper portion remaining entirely closed. Connecting portion 32', in this embodiment, is comparatively narrow and is received together with the upper portion of the legs 30', 31' between two partitions 70, 71, provided underneath the upper wall of the upper portion against a side wall 20'. Partitions 70, 71 each fall between a leg 30' or 31' and the finger 37', 38' extending along said leg. Cut-outs are provided at the portions of the partitions contiguous with the upper wall 21' of the upper portion 3', said cut-outs receiving the ends of the connecting portion 32' extending beyond the legs. As a result, the stop 57 of the upper portion shown in FIG. 4 can be omitted. The coupling element of FIG. 6 further differs from the above described coupling elements mainly in that the legs 30', 31' are substantially straight and in that the lug-shaped cross ribs 40', 41' and noses 34' are narrower than the fingers on which the lug means, and the noses, respectively, are provided. These and similar modifications are deemed not to depart from the scope of the present invention.

I claim:

1. A stackable drawer box comprising:
    a plurality of side walls, and
    receiving means on at least two of said plurality of side walls for receipt of and retention of a coupling element which includes spaced parallel legs connected by a connecting portion and spaced parallel fingers extending substantially parallel to and from the spaced legs toward the connecting portion,
    said receiving means including lug members for inwardly biasing the legs and the fingers of the coupling element as the coupling element is forced past said lug members and a stop for engaging the connecting portion of the coupling element so as to enable a displacement in a downward direction of the coupling element located in said receiving means from an inoperative position, in which the coupling element is substantially located within said receiving means of a first drawer box, into a coupling position, in which the coupling element coacts with a second drawer box located subjacent to the first drawer box of two stacked drawer boxes so that said lug members of the second drawer box engage the fingers of the coupling element after the legs and fingers of the coupling element have moved past the lug members of the first drawer box, and a continued displacement in the downward direction of the coupling element relative to both boxes is blocked by said stop of the first drawer box engaging the connecting portion of the coupling element and said lug members of the second drawer box prevent displacement in a direction opposite to the downward direction of the coupling element.

2. A stackable drawer box as claimed in claim 1, wherein two parallel strips located on said side walls extend transversely to a plane of said side walls and extend in a vertical direction on said side walls, said strips having facing surfaces between which a coupling element can be received, and which are each provided with said lug members, and said stop being further provided between said strips.

3. A stackable drawer box as claimed in claim 1, further comprising said coupling element being U-shaped and having said legs being resilient and two in number and a connecting portion, each of the legs being provided on the outside with a nose engaging at least in the coupling position of said coupling element behind corresponding lug surfaces of lug members of the box of either of two coupled drawer boxes, said connecting portion of said coupling element being locked in the box of the other drawer box.

4. A stackable drawer box as claimed in claim 3, wherein each resilient leg of said U-shaped coupling element includes said finger which is resilient, and which is provided adjacent a free end with at least one lug member coacting with at least one lug member of the box for maintaining said coupling element in the inoperative position.

5. A stackable drawer box as claimed in claim 3, wherein said connecting portion in the coupling position of said coupling element abuts against said stop.

6. A stackable drawer box as claimed in claim 3, wherein a partition extends between the legs of said U-shaped coupling elements and forms part of said connecting portion.

7. A stackable drawer box as claimed in claim 6, wherein said partition in the coupling position of said coupling element abuts against said stop.

8. A stackable drawer box as claimed in claim 3, wherein said stop is disposed on said side walls and leaves space on either side for said legs of said coupling element.

9. A stackable drawer box as claimed in claim 8, wherein said stop lies on a bottom surface of the drawer box.

10. A stackable drawer box as claimed in claim 1, wherein said lug members and stops are formed as ribs on each of two opposite surfaces of the box, between which said coupling element, in use, is received, and said ribs extend transversely to said side walls of the drawer box, said ribs having a substantially rectangular cross section, and said stops being provided between said surfaces; and said coupling element having a substantially inverted U-shape with said legs being resilient and two in number, each having a nose facing outwardly, with an upper surface extending transversely to said legs and an oblique lower surface, with said fingers being resilient and extending from said noses substantially parallel to said legs of the U-shape in an upward direction, each said finger, near an end having two spaced apart, lug-shaped cross ribs with inclined run-on surfaces, said coupling element having a portion forming the bottom of the U-shape, while in the inoperable position of said coupling element, said lug-shaped cross ribs of each resilient finger engaging about a corresponding rectangular rib of the box, while in the coupling position, said portion forming the bottom of the U-shape, with said portion situated between the resilient legs abuts against said stop and top surfaces of said noses of said resilient legs engage underneath said rectangular ribs of a subjacent drawer box.

11. A stackable drawer box as claimed in claim 1, wherein said coupling element has a length that as long as a height of the drawer box.

12. A filing cabinet comprising
a plurality of stacked and interconnected drawer boxes,
each of said drawer boxes comprising
a plurality of side walls, and
receiving means on at least two of said plurality of side walls for receipt of and retention of a coupling element which includes spaced parallel legs connected by a connecting portion and spaced parallel fingers extending substantially parallel to and from the spaced legs toward the connecting portion,
said receiving means including lug members for inwardly biasing the legs and the fingers of the coupling element as the coupling element is forced past said lug members and a stop for engaging the connecting portion of the coupling element so as to enable a displacement in a downward direction of the coupling element located in said receiving means from an inoperative position, in which the coupling element is substantially located within said receiving means of a first drawer box, into a coupling position, in which the coupling element coacts with a second drawer box located subjacent to the first drawer box of two stacked drawer boxes so that said lug members of the second drawer box engage the fingers of the coupling element after the legs and fingers of the coupling element have moved past the lug members of the first drawer box, and a continued displacement in the downward direction of the coupling element relative to both boxes is blocked by said stop of the first drawer box engaging the connecting portion of the coupling element and said lug members of the second drawer box prevent displacement in a direction opposite to the downward direction of the coupling element.

13. A filing cabinet as claimed in claim 12, wherein a base having at least one flange corresponding with a flange of the other drawer boxes, said flanges being adapted to receive a lowermost portion of said coupling element of a drawer box placed on said base, and which is provided with said lug members for locking said coupling element.

14. A filing cabinet as claimed in claim 12, wherein an upper wall of a drawer box is provided with at least one opening through which a coupling element can be pushed into said flanges of an upper drawer box and having said stop coacting with said coupling element in the coupling position.

15. A filing cabinet as claimed in claim 14, wherein the opening in said upper wall encloses an upper surface of said coupling element.

16. A filing cabinet as claimed in claim 12, wherein an upper portion of an upper wall includes walls depending from said upper wall, with in at least one place underneath said upper wall and against a depending wall, flanges adapted to receive said connecting portion and an upper portion of said legs of a coupling element.

17. A filing cabinet as claimed in claim 16, said flanges include two partitions extending transversely to said upper wall and said depending wall, said partitions, in operation, each engaging between said leg and said finger of said coupling element and having cut-outs for receiving said connecting portion of said coupling element.

* * * * *